(12) United States Patent
Forget

(10) Patent No.: US 9,944,406 B2
(45) Date of Patent: Apr. 17, 2018

(54) SAFETY DEVICE FOR AN EXTENSION SOCKET

(71) Applicant: Airbus Operations SAS, Toulouse (FR)

(72) Inventor: Frédéric Forget, Saint Cricq (FR)

(73) Assignee: Airbus Operations SAS (FR)

( * ) Notice: Subject to any disclaimer, the term of this patent is extended or adjusted under 35 U.S.C. 154(b) by 220 days.

(21) Appl. No.: 14/931,345

(22) Filed: Nov. 3, 2015

(65) Prior Publication Data

US 2016/0122037 A1    May 5, 2016

(30) Foreign Application Priority Data

Nov. 4, 2014    (FR) ...................................... 14 60634

(51) Int. Cl.
| | |
|---|---|
| *H01R 13/66* | (2006.01) |
| *H01R 25/00* | (2006.01) |
| *B64D 47/00* | (2006.01) |
| *B64F 1/36* | (2017.01) |
| *H01R 31/06* | (2006.01) |

(Continued)

(52) U.S. Cl.
CPC ................ *B64D 47/00* (2013.01); *B64F 1/36* (2013.01); *B64F 1/364* (2013.01); *H01R 13/665* (2013.01); *H01R 13/6641* (2013.01); *H01R 13/6666* (2013.01); *H01R 25/00* (2013.01); *H01R 31/06* (2013.01); *H02H 9/04* (2013.01); *H02J 4/00* (2013.01); *H02J 7/0029* (2013.01); *H02J 7/0042* (2013.01); *H02J 7/027* (2013.01); *B64D 45/02* (2013.01); *H01R 27/02* (2013.01); *H01R 2201/26* (2013.01)

(58) Field of Classification Search
CPC ......... B64D 47/00; B64D 45/02; B64F 1/364; B64F 1/36; H02H 9/04; H02J 4/00; H01R 2201/26; H01R 13/6666; H01R 31/06; H01R 13/665; H01R 13/6641; H01R 25/00

See application file for complete search history.

(56) References Cited

U.S. PATENT DOCUMENTS

| | | | |
|---|---|---|---|
| 4,729,055 | A | 3/1988 | Dorival et al. |
| 4,823,383 | A | 4/1989 | Cardot et al. |

(Continued)

FOREIGN PATENT DOCUMENTS

| | | |
|---|---|---|
| EP | 0 268 947 A1 | 6/1988 |
| FR | 2 600 465 A1 | 12/1987 |

OTHER PUBLICATIONS

FR 14 60634 Search Report dated Jun. 22, 2015.

*Primary Examiner* — Jared Fureman
*Assistant Examiner* — Emmanuel R Dominique
(74) *Attorney, Agent, or Firm* — Lerner, David, Littenberg, Krumholz & Mentlik, LLP

(57) ABSTRACT

A socket system for the protection against lightening of an aircraft disposed between a connection terminal of the aircraft and an end connector of a generator set powered by a power supply cable having several electrical conductors includes an extension socket connected between the end connector and the connection terminal and a safety device including in a housing made of electrically insulating material, and clipping means designed to clip an electrical signal. The installation of such a safety device prevents the propagation of an electrical overvoltage beyond the safety device.

9 Claims, 1 Drawing Sheet

(51) Int. Cl.
*H02H 9/04* (2006.01)
*H02J 4/00* (2006.01)
*H02J 7/00* (2006.01)
*H02J 7/02* (2016.01)
H01R 27/02 (2006.01)
B64D 45/02 (2006.01)

(56) References Cited

U.S. PATENT DOCUMENTS

| | | | |
|---|---|---|---|
| 5,543,999 A | 8/1996 | Riley | |
| 7,547,997 B1 | 6/2009 | Simunek et al. | |
| 7,682,198 B1* | 3/2010 | Plattner | H01R 31/06 |
| | | | 439/638 |
| 9,484,749 B2* | 11/2016 | Brombach | B64F 1/34 |
| 2004/0011918 A1* | 1/2004 | Musial | B64F 1/34 |
| | | | 244/1 R |
| 2012/0045906 A1* | 2/2012 | Thomas | B64F 1/227 |
| | | | 439/35 |
| 2013/0323982 A1* | 12/2013 | White | H01R 13/6215 |
| | | | 439/660 |

\* cited by examiner

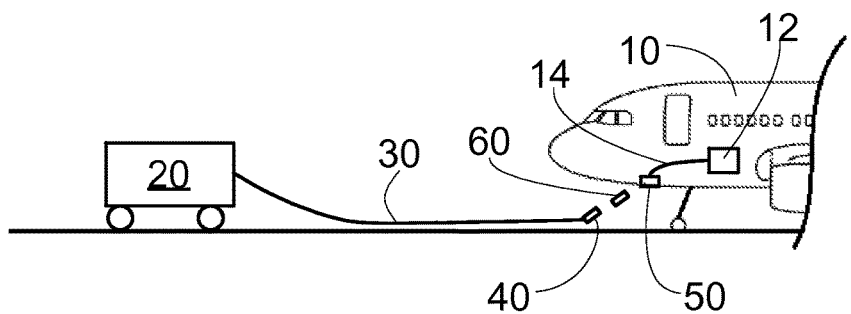
Fig. 1
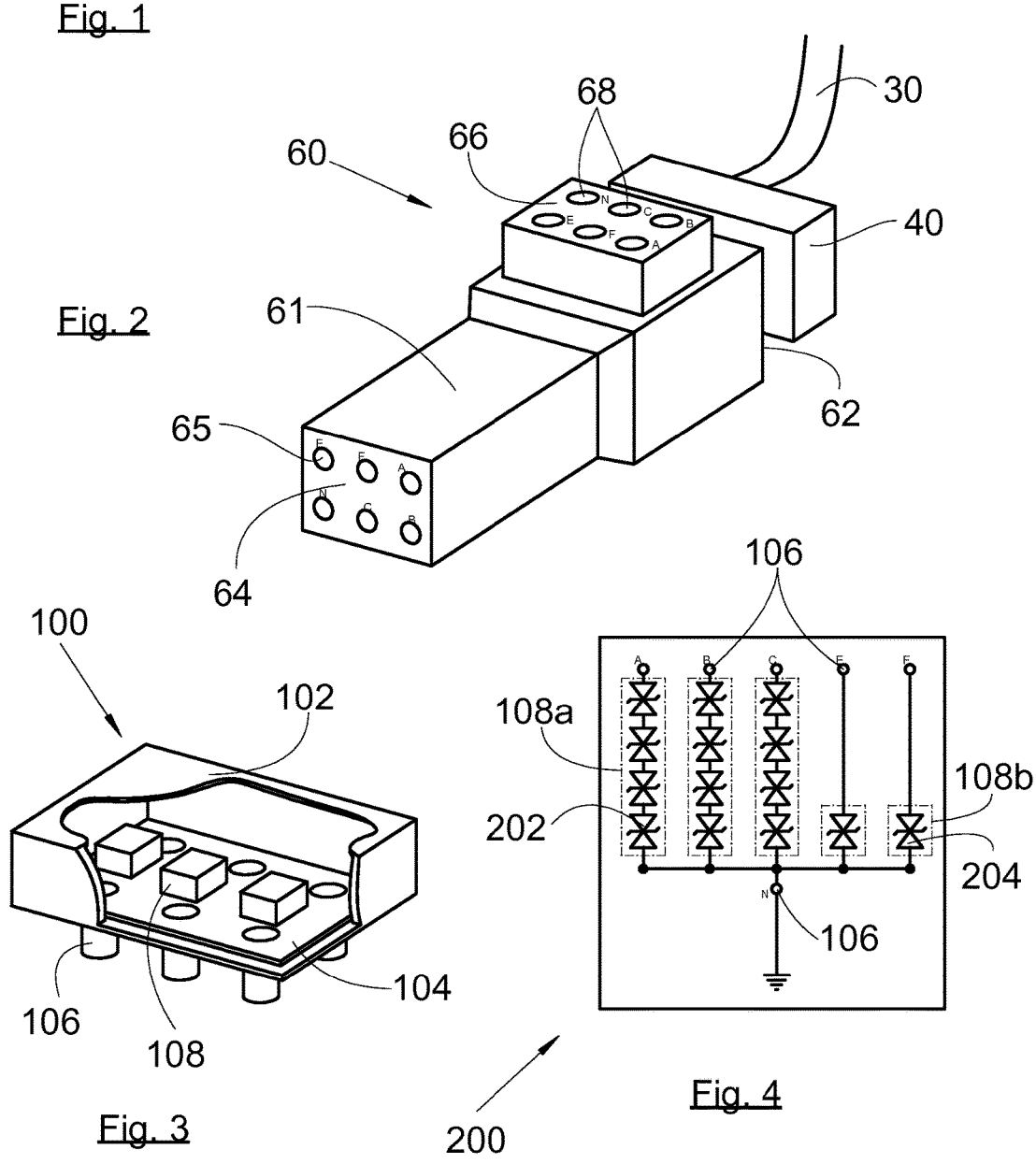
Fig. 2
Fig. 3
Fig. 4

SAFETY DEVICE FOR AN EXTENSION SOCKET

FIELD OF INVENTION

The present invention relates to a socket system for the protection against lightening of an aircraft powered with electricity by means of a generator set, and an ensemble comprising an aircraft, a generator set and such a socket system.

BACKGROUND OF THE INVENTION

FIG. 1 shows an aircraft 10 which is immobile on the ground. The aircraft is powered with electricity by means of a generator set 20 via a power supply cable 30 which has several electrical conductors and is provided at its end with an end connector 40 having an electrical contact for each electrical conductor.

In order to allow connection to the generator set 20, the aircraft 10 has a connection terminal 50 having, for each electrical conductor, an electrical contact downstream of which a conductor 14 is connected embedded in the aircraft 10 and to which at least one electrical component 12 of the aircraft 10 is connected.

The connection between the end connector 40 and the connection terminal 50 is performed by means of an extension socket 60.

FIG. 2 shows an example of an extension socket 60 comprising a body 61 with a first connector 62 comprising, for each electrical contact of the end connector 40, an electrical contact which is connected electrically to the said electrical contact of the end connector 40, and a second connector 64 comprising, for each electrical conductor, an electrical contact 65 (in this case female) which is electrically connected to the electrical contact of the first corresponding connector 62 and which is designed to be connected to an electrical contact (in this case male) of the connection terminal 50.

The extension socket 60 allows here the connection of six electrical conductors which are indicated here by the reference letters A, B, C, N, E and F. The connection terminal 50 thus comprises, for each electrical conductor A, B, C, N, E, F, an embedded conductor 14 which is electrically connected to an electrical conductor A, B, C, N, E, F via the second connector 64 and the connection terminal 50.

The extension socket 60 has a third connector 66 which, for each electrical conductor, has a female electrical contact 68 which is electrically connected to the electrical contact of the first connector 62 connected to the said electrical conductor and which allows for example the connection of a connecting member of a multimeter.

The connection of the generator set 20 to the aircraft 10 forms a loop.

When lightning strikes the ground close to the aircraft 10, a part of the magnetic field induced by the lightning generates a voltage drop in the loop, creating an inductive coupling which generates an electrical overvoltage in the power supply cable 30. This electrical overvoltage is propagated as far as the aircraft 10 with the risk of damaging certain electrical components 12 on-board the aircraft 10.

BRIEF SUMMARY OF THE INVENTION

An aspect of the present invention proposes a socket system for the protection against lightening of an aircraft which does not have the drawbacks of the prior art and which in particular prevents the propagation of an electrical overvoltage as far as the aircraft.

Described herein is a socket system for the protection against lightening of an aircraft powered with electricity by means of a generator set thanks to a power supply cable comprising several electrical conductors and at the end of which is set an end connector having an electrical contact for each electrical conductor, the aircraft having a connection terminal having, for each electrical conductor, an electrical contact downstream of which is connected a conductor embedded in the aircraft and to which is connected at least one electrical component of the aircraft, the socket system comprising:

an extension socket connected between the end connector and the connection terminal and comprising:
a first connector connected to the end connector and having, for each electrical conductor of the end connector, an electrical contact designed to be electrically connected to the said each electrical conductor of the end connector,
a second connector having, for each electrical contact of the first connector, an electrical contact which is electrically connected to the said electrical contact of the first connector and connected to an electrical contact of the connection terminal,
a third connector having, for each electrical contact of the first connector, a female electrical contact electrically connected to the said electrical contact of the first connector, and
a safety device comprising:
a housing made of electrically insulating material,
for each female electrical contact, a male electrical contact made of electrically conductive material, projecting from the housing and designed to be inserted in the said female electrical contact,
clipping means designed to clip an electrical signal,
a printed circuit seated inside the housing and having conductive tracks connecting the male electrical contacts and the clipping means.

Such a socket system prevents the propagation of an electrical overvoltage as far as the aircraft by means of signal clipping.

Advantageously, one of the conductors is the neutral conductor and clipping means are arranged between each male electrical contact corresponding to an electrical conductor other than neutral and the male electrical contact corresponding to neutral.

Advantageously, each clipping means is an assembly consisting of a diode or several diodes mounted in series between the male electrical contact corresponding to each electrical conductor other than neutral and the male electrical contact corresponding to neutral.

Advantageously, each diode has a transition time which is less than the time for which each electrical component to be protected may be exposed to an overvoltage without damage.

According to a particular embodiment, when the electrical conductor is an electrical conductor carrying a low voltage current, the clipping means consist of four diodes mounted in series.

According to a particular embodiment, when the electrical conductor is an electrical conductor carrying a very low voltage current, the clipping means consist of one diode.

Advantageously, each diode has a maximum current intensity able to flow therein greater than the current intensity during the overvoltage.

Advantageously, for each conductor, the number of diodes is the integral which is marginally greater than the ratio between the maximum voltage flowing in the electrical conductor and the limit voltage value at which the diode passes from a blocking state to a conducting state.

A set comprising:
a generator set comprising a power supply cable comprising several electrical conductors and at the end of which is set an end connector having an electrical contact for each electrical conductor,
an aircraft powered with electricity by means of said generator set and having a connection terminal having, for each electrical conductor, an electrical contact downstream of which is connected a conductor embedded in the aircraft and to which is connected at least one electrical component of the aircraft, and
a socket system according to previous embodiment.

BRIEF DESCRIPTION OF THE DRAWINGS

The characteristic features of the invention mentioned above, as well as other features, will appear more clearly from a reading of the following description of an example of embodiment, the said description being provided with reference to the attached drawings in which:

FIG. 1 shows an aircraft on the ground connected to a generator set;

FIG. 2 shows an extension socket according to the state of the art;

FIG. 3 shows a partially cut-away view of a safety device according to an embodiment of the invention; and FIG. 4 shows an electrical diagram of the safety device according to an embodiment of the invention.

FIG. 3 shows a safety device 100 which is designed to be implemented in conjunction with an extension socket 60 such as that shown in FIG. 2 and in conjunction with an installation such as that shown in FIG. 1, together with a generator set 20 and an aircraft 10 comprising a connection terminal 50 for the protection against lightening of the aircraft 10. The installation according to an embodiment of the invention presents a set comprising the generator set 20, the aircraft 10 and a socket system such as described hereafter.

DETAILED DESCRIPTION

The aircraft 10 is powered with electricity by the generator set 20 thanks to a power supply cable 30 comprising several electrical conductors and at the end of which is set an end connector 40 having an electrical contact for each electrical conductor. The aircraft 10 has a connection terminal 50 having, for each electrical conductor, an electrical contact downstream of which is connected a conductor 14 embedded in the aircraft 10 and to which is connected at least one electrical component 12 of the aircraft 10 to be protected.

The extension socket 60 also comprises a first connector 62 which for each electrical conductor from the generator set 20 has an electrical contact which can be electrically connected to the said electrical conductor by means of an end connector 40.

The extension socket 60 also comprises a second connector 64 which has, for each electrical contact of the first connector 62, an electrical contact 65 which is electrically connected to the said electrical contact of the first connector 62 and therefore to the associated electrical conductor. Each electrical contact 65 is designed to be connected to an electrical contact of the connection terminal 50, an embedded conductor 14 being connected downstream of said electrical contact to electrical components 12 to be protected.

The extension socket 60 also comprises a third connector 66 which has, for each electrical contact of the first connector 62, a female electrical contact 68 which is electrically connected to the said electrical contact of the first connector 62 and therefore to the associated electrical conductor.

In the context of the invention, the third connector 66 seats the safety device 100.

Of course, it is possible to provide an extension socket of another type where the electrical conductors A, B, C, E, F and N have a different layout and their number is different.

The safety device 100 comprises:
a housing 102 made of electrically insulating material;
for each female electrical contact 68, a male electrical contact 106 made of electrically conductive material, projecting from the housing 102 and designed to be inserted in the said female electrical contact 68;
clipping means 108 designed to clip an electrical signal;
a printed circuit 104 seated inside the housing 102 and having conductive tracks connecting the male electrical contacts 106 and the clipping means 108.

Thus, by connecting the safety device 100 onto the third connector 66, an electrical overvoltage on one of the electrical conductors is clipped by the clipping means 108 and the components of the aircraft 10 are protected.

During normal mode, the clipping means 108 are transparent, while, beyond a certain voltage the clipping means 108 will clip the signal.

FIG. 4 shows a diagram of an electric circuit 200 of the printed circuit 104 of the safety device 100 in a preferred embodiment.

In this embodiment the first electrical conductors A, B and C are electrical conductors carrying a low voltage current which is preferably of the order of 115-200V at 400 Hz, the two electrical conductors E and F are electrical conductors carrying a very low voltage current which is preferably of the order of 28V and 0.5V and the third electrical conductor N is the neutral connected to earth.

The first electrical conductors A, B and C are the phase conductors.

The two electrical conductors E and F are called "discrete command conductors".

Clipping means 108a,108b are arranged between each male electrical contact 106 corresponding to a first electrical conductor A, B and C or to a second electrical conductor E and F, i.e. an electrical conductor A, B, C, E, F other than neutral N, and the male electrical contact 106 corresponding to neutral N. The clipping operation thus consists, in the case of an electrical overvoltage in an electrical conductor A, B, C, E, F, in setting this electrical conductor to the neutral which is itself connected to the earth of the aircraft 10.

Preferably, each clipping means 108a, 108b is an assembly consisting of a diode 204 or several diodes 202 mounted in series between the male electrical contact 106 corresponding to each electrical conductor A, B, C, E, F other than neutral N and the male electrical contact 106 corresponding to neutral N.

In this embodiment of the invention, when the voltage in the electrical conductor A, B, C, E, F exceeds the limit voltage (also called "inversion voltage" or "clipping voltage" or also "clamping voltage") of the diode or diodes 202, 204, the latter are switched from a blocking state to a conducting state and start to conduct and transfer the electrical overvoltage towards the neutral N which is itself connected to the earth of the aircraft 10.

For each electrical conductor A, B, C, E, F, other than neutral N, departing from the generator set 20, the characteristics and the number N of diodes 202, 204 are chosen depending on the conditions of use of the safety device 100.

The characteristics of a diode 202, 204 are as follows:
the transition time between the blocking state and the conducting state,
the maximum current intensity able to flow in the diode 202, 204, and
the limit voltage at which the diode starts to conduct.

The conditions of use are as follows:
the current intensity during the overvoltage,
for each electrical conductor, the maximum voltage flowing in the said electrical conductor (with preferably a margin of 10 to 15% corresponding to the conventional fluctuations of the voltage flowing in the generator set 20), and
the time interval for which each electrical component 12 to be protected may accept an overvoltage without suffering damage.

For an electrical conductor and the associated embedded conductor 14, each diode 202, 204 is firstly chosen so that its transition time is less than the time for which the electrical component 12 to be protected and electrically connected to the said embedded conductor 14 may be exposed to an overvoltage without damage; among these diodes 202, 204, only those diodes 202, 204 which have a maximum current intensity able to flow therein greater than the current intensity during the overvoltage are retained.

For each model of diodes 202, 204 which satisfies these two criteria and for each electrical conductor, the number N of diodes is thus the integral which is marginally greater than the ratio between the maximum voltage flowing in the electrical conductor and the limit voltage of the diode 202, 204.

With a view to optimization, the diode 202, 204 for which N is the smallest is chosen.

It is also possible to take into account additional criteria. For example, the diodes 202, 204 which have a lower residual voltage will be preferred, preference being given to the diodes 202, 204 able to dissipate a greater power.

In the case of the first electrical conductors A, B and C, the clipping means 108a consist of four diodes 202 which are identical and mounted in series.

In the case of the two electrical conductors E and F, the clipping means 108b consist of a diode 204.

The diodes 202, 204 are for example diodes which are identified by the reference code 30KPA54CA or 30KPA58CA of the manufacturers Littlefuse.

The safety device 100 and the extension socket 60 form a socket system according to the invention which is connected to the plurality of electrical conductors.

In order to prevent the humidity or the dust from entering into the female electrical contacts 68 and the male electrical contacts 106, the housing 102 is sealingly mounted on the extension socket 60.

According to a particular embodiment of the invention, the length of the conductor between the male electrical contact 106 corresponding to neutral N and the earth is less than 0.85 m and its resistance is less than 50μΩ.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A socket system for the protection against lightening of an aircraft powered with electricity by a generator set and a power supply cable comprising several electrical conductors and at the end of which is set an end connector having an electrical contact for each electrical conductor, the aircraft having a connection terminal having, for each electrical conductor, an electrical contact downstream of which is connected a conductor embedded in the aircraft and to which is connected at least one electrical component of the aircraft, the socket system comprising:
an extension socket connected between the end connector and the connection terminal and comprising:
a first connector connected to the end connector and having, for each electrical conductor of the end connector, an electrical contact configured to be electrically connected to said each electrical conductor of the end connector;
a second connector having, for each electrical contact of the first connector, an electrical contact which is electrically connected to said electrical contact of the first connector and connected to an electrical contact of the connection terminal;
a third connector having, for each electrical contact of the first connector, a female electrical contact electrically connected to said electrical contact of the first connector; and
a safety device configured to be electrically coupled to the third connector and comprising:
a housing made of electrically insulating material;
for each female electrical contact of the third connector, a male electrical contact projecting from the housing and configured to be inserted in said female electrical contact of the third connector;
clipping means configured to clip an electrical signal; and
a printed circuit seated inside the housing and having conductive tracks connecting the male electrical contacts and the clipping means.

2. The socket system according to claim 1, wherein one of the conductors is the neutral conductor and wherein clipping means are arranged between each male electrical contact corresponding to an electrical conductor other than the neutral and the male electrical contact corresponding to the neutral.

3. The socket system according to claim 2, wherein each clipping means is an assembly including one diode or several diodes mounted in series between the male electrical contact corresponding to each electrical conductor other than the neutral and the male electrical contact corresponding to the neutral.

4. The socket system according to claim 3, wherein each diode has a transition time which is less than the time for which each electrical component to be protected may be exposed to an overvoltage without damage.

5. The socket system according to claim 3, wherein, when the electrical conductor is an electrical conductor carrying a low voltage current, the clipping means includes four diodes mounted in series.

6. The socket system according to claim 3, wherein, when the electrical conductor is an electrical conductor carrying a very low voltage current, the clipping means includes one diode.

7. The socket system according to claim 3, wherein each diode has a maximum current intensity able to flow therein greater than the current intensity during the overvoltage.

8. The socket system according to claim 7, wherein, for each conductor, the number of diodes is the integral which is marginally greater than the ratio between the maximum voltage flowing in the electrical conductor and the limit voltage, corresponding to the voltage value at which the diode passes from a blocking state to a conducting state.

9. A set comprising:
- a generator set comprising a power supply cable comprising several electrical conductors and at the end of which is set an end connector having an electrical contact for each electrical conductor,
- an aircraft powered with electricity by said generator set and having a connection terminal having, for each electrical conductor, an electrical contact downstream of which is connected a conductor embedded in the aircraft and to which is connected at least one electrical component of the aircraft, and
- a socket system comprising:
  - an extension socket connected between the end connector and the connection terminal, the extension socket having a first body having a first end, a second end, and a third end, the extension socket comprising:
    - a first connector, at the first end of the body, connected to the end connector and having, for each electrical conductor of the end connector, an electrical contact configured to be electrically connected to said each electrical conductor of the end connector;
    - a second connector, at the second end of the body, having, for each electrical contact of the first connector, an electrical contact which is electrically connected to said electrical contact of the first connector and connected to an electrical contact of the connection terminal;
    - a third connector, at the third end of the body, having, for each electrical contact of the first connector, a female electrical contact electrically connected to said electrical contact of the first connector; and
  - a safety device having a second body and comprising:
    - a housing made of electrically insulating material;
    - for each female electrical contact, a male electrical contact projecting from the housing and configured to be inserted in said female electrical contact;
    - clipping means configured to clip an electrical signal; and
    - a printed circuit seated inside the housing and having conductive tracks connecting the male electrical contacts and the clipping means.

* * * * *